(12) United States Patent
Brickel

(10) Patent No.: US 10,491,590 B2
(45) Date of Patent: Nov. 26, 2019

(54) SYSTEM AND METHOD FOR VERIFYING AND REDIRECTING MOBILE APPLICATIONS

(71) Applicant: AssetWorks LLC, Wayne, PA (US)

(72) Inventor: Richard Brickel, Pottstown, PA (US)

(73) Assignee: AssetWorks LLC, Wayne, PA (US)

( * ) Notice: Subject to any disclaimer, the term of this patent is extended or adjusted under 35 U.S.C. 154(b) by 61 days.

(21) Appl. No.: 14/880,478

(22) Filed: Oct. 12, 2015

(65) Prior Publication Data

US 2017/0104754 A1     Apr. 13, 2017

(51) Int. Cl.
| | |
|---|---|
| H04L 29/06 | (2006.01) |
| H04L 9/32 | (2006.01) |
| H04L 29/08 | (2006.01) |
| H04W 12/06 | (2009.01) |

(52) U.S. Cl.
CPC ........ *H04L 63/0876* (2013.01); *H04L 9/3247* (2013.01); *H04L 63/0442* (2013.01); *H04L 63/123* (2013.01); *H04L 67/1097* (2013.01); *H04W 12/06* (2013.01)

(58) Field of Classification Search
CPC ............... H04L 63/0876; H04L 9/3247; H04L 63/0442; H04L 63/123
See application file for complete search history.

(56) References Cited

U.S. PATENT DOCUMENTS

| | | | | |
|---|---|---|---|---|
| 9,293,042 | B1* | 3/2016 | Wasserman | ...... H04N 21/41422 |
| 2001/0037379 | A1* | 11/2001 | Livnat | ................ G06F 21/6218 |
| | | | | 709/219 |
| 2002/0156558 | A1* | 10/2002 | Hanson | .................. G07C 5/008 |
| | | | | 701/29.3 |
| 2002/0183045 | A1* | 12/2002 | Emmerson | .............. H04L 63/08 |
| | | | | 455/412.1 |
| 2004/0002943 | A1* | 1/2004 | Merrill | ................ H04L 41/0893 |
| 2004/0039827 | A1* | 2/2004 | Thomas | .................. H04L 29/06 |
| | | | | 709/228 |
| 2008/0154712 | A1* | 6/2008 | Wellman | .............. G05D 1/0282 |
| | | | | 235/384 |
| 2008/0228906 | A1* | 9/2008 | Yerubandi | ............... H04W 4/18 |
| | | | | 709/223 |
| 2010/0031022 | A1* | 2/2010 | Kramer | ............... G06F 21/6218 |
| | | | | 713/155 |
| 2011/0010456 | A1* | 1/2011 | Saeki | .................... G06F 9/5094 |
| | | | | 709/226 |
| 2011/0093554 | A1* | 4/2011 | Shin | ........................ H04L 67/18 |
| | | | | 709/207 |
| 2011/0125602 | A1* | 5/2011 | Kamada | ............. G06Q 30/0601 |
| | | | | 705/26.1 |
| 2011/0131415 | A1* | 6/2011 | Schneider | ............. H04L 9/3226 |
| | | | | 713/171 |

(Continued)

*Primary Examiner* — John B King
*Assistant Examiner* — Darshan I Dhruv
(74) *Attorney, Agent, or Firm* — Erise IP, P.A.

(57) ABSTRACT

A system for securely providing a mobile device application on a mobile device access to a fleet operator datacenter for the mobile device application to obtain fleet data therefrom for use by a mobile device user. A verification server facilitates one or more fleet operator datacenters to authenticate a mobile device user, via configurable authentication requirements, before a mobile device user is able to communicate directly with the fleet operator datacenter.

12 Claims, 3 Drawing Sheets

(56) References Cited

U.S. PATENT DOCUMENTS

| | | | | |
|---|---|---|---|---|
| 2011/0246987 A1* | 10/2011 | Diwakar | ............... | G06F 9/5094 |
| | | | | 718/1 |
| 2011/0302098 A1* | 12/2011 | Yoshida | .............. | G06F 16/9535 |
| | | | | 705/319 |
| 2012/0133770 A1* | 5/2012 | Joao | ................... | G01C 21/3691 |
| | | | | 348/149 |
| 2012/0324556 A1* | 12/2012 | Yefimov | ............... | H04W 12/06 |
| | | | | 726/7 |
| 2013/0164714 A1* | 6/2013 | Hunt | ................... | G09B 19/167 |
| | | | | 434/65 |
| 2013/0254850 A1* | 9/2013 | Alison | ................... | H04W 4/21 |
| | | | | 726/4 |
| 2014/0173699 A1* | 6/2014 | Daly | .................... | H04L 63/104 |
| | | | | 726/4 |
| 2014/0230031 A1* | 8/2014 | Schneider | ............... | H04L 63/08 |
| | | | | 726/6 |
| 2015/0181046 A1* | 6/2015 | Vigroux | ............... | G06Q 20/123 |
| | | | | 705/44 |
| 2015/0199775 A1* | 7/2015 | Pfeiffer | ............ | G06Q 10/06398 |
| | | | | 705/7.42 |
| 2016/0088066 A1* | 3/2016 | Thomas | .................. | H04L 67/10 |
| | | | | 709/203 |
| 2016/0112396 A1* | 4/2016 | Paya | ................... | H04L 63/0823 |
| | | | | 713/156 |
| 2016/0134599 A1* | 5/2016 | Ross | ....................... | H04L 63/08 |
| | | | | 713/168 |
| 2017/0004293 A1* | 1/2017 | Mantri | .................... | G06F 3/017 |

* cited by examiner

SYSTEM AND METHOD FOR VERIFYING AND REDIRECTING MOBILE APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The invention relates generally to mobile applications. More specifically it relates to a method and system to authenticate and redirect a mobile application through a verification server.

BACKGROUND

Fleet operators must manage a large number of vehicles and drivers that are constantly spread out across a wide geographic area. With the rise in smart phone technology, many fleet operators want to take advantage of the benefits of mobile phones, and are now using targeted, line-of-business applications ("apps") that help their employees gain access to information quickly and efficiently.

Rather than develop their own software, some fleet operators purchase third party mobile applications, to help manage their fleets. Fleet operators require specific software to manage their fleet operations such as FleetFocus™ by Assetworks.

Even though the mobile application is developed by a third party, it is desirable for fleet operators to host their data it in their own data centers. This poses a challenge when a fleet employee needs to connect a mobile application, which was downloaded from a central app store, to data that lives in the fleet operator's data center. For obvious security reasons, it is important to restrict access to this data to authorized individuals only.

Most mobile phone applications are available for download from large, popular sources such as an app store like Google Play® or the Apple® app store (iOS). A typical experience for the ordinary mobile user after downloading an app, is to enter some form of login credentials (or something creates new credentials) prior to the first use.

Currently, to access software and data located within a fleet operator data center using an app downloaded from an app store, a fleet employee needs to access a settings screen and configure the location of the fleet operator data, as well as perform other configuration steps before the app can be used. It is desirable to allow fleet employees using mobile apps a simple and efficient way to gain access to the fleet operator data center, such as a one-time verification using a username and password or a personal identification number ("PIN").

SUMMARY OF THE INVENTION

There is a system for securely providing a mobile device application on a mobile device access to a fleet operator datacenter for the mobile device application to obtain fleet data therefrom for use by a mobile device user, the system comprising: a verification server, comprising a verification server uniform resource locator to facilitate communication therewith, the verification server configured to: obtain a selected fleet operator, from a mobile device user selection on the mobile device; get a credential information request from the fleet operator server of the selected fleet operator; send the credential information request to the mobile device; communicate the credential information received from the mobile device to the fleet operator server to authenticate the mobile device user; and if the mobile device user is authenticated then: transmitting a fleet operator uniform resource locator (URL) of the fleet operator server of the selected fleet operator to the mobile device application to be a mobile device fleet operator URL to which the mobile device application communicates to receive fleet data.

The request may be provided by the mobile device to a verification uniform resource locator configured in the mobile device application before the mobile device application was downloaded from an app store and installed on the mobile device.

The credential information request may comprise a set of credential information that the selected fleet operator has configured to be required for authenticating a mobile device user.

The verification server may further be configured to receive a first public encryption key from the mobile device and the communicated credential information request may be encrypted by the fleet operator server using the first public encryption key before it is received from the fleet operator server.

The credential information request may further comprise a second public encryption key and the communicated credential information may be encrypted by the mobile device using the second public encryption key before it is received from the mobile device.

The communicated credential information received from the mobile device to the fleet operator server may be embedded within a signature, and the signature may comprise a hash value of the credential information, date and time information and session information.

The verification server may be further configured to provide a fleet operator list to a mobile device application on a mobile device in response to a request from the mobile device application for a fleet operator list.

The fleet operator list may be a list of all fleet operators known by the verification server or a subset of all fleet operators known by the verification server, such subset comprising fleet operators associated with the mobile device application.

There is also a system for securely providing a mobile device application on a mobile device access to a fleet operator datacenter for the mobile device application to obtain fleet data therefrom for use by a mobile device user, the system comprising: a wireless device having computer-executable instructions implementing software for: selecting a fleet operator and communicating the selected fleet operator to a verification server via a verification server uniform resource locator; receiving, from the verification server, a credential information request obtained by the verification server from a fleet operator server of the selected fleet operator; enabling inputting and sending of credential information, from a mobile device user, responsive to the credential information request, to a verification server via a verification server uniform resource locator to send to the fleet operator server of the selected fleet operator to authenticate the mobile device user; and if the mobile device user is authenticated then: obtaining, from the fleet operator server via the verification server, a uniform resource locator (URL) of the fleet operator server of the selected fleet operator to be a mobile device fleet operator URL to which the mobile device application communicates to receive fleet data.

The mobile device may further comprise a verification server uniform resource locator, to facilitate communication with the verification server, configured in the mobile device application before the mobile device application was downloaded from an app store and installed on the mobile device.

The credential information request may comprise a set of credential information that the selected fleet operator has configured to be required for authenticating a mobile device user.

The credential information request may further comprise a public encryption key and the communicated credential information is encrypted by the mobile device using the public encryption key before it is sent by the mobile device.

The credential information sent by the mobile device may be embedded within a signature, and the signature may comprises a hash value of the credential information, date and time information and session information.

The credential information request may be encrypted and may only be decrypted by the mobile device application.

The system may further comprise getting a fleet operator list from verification server in response to a request from the mobile device application for a fleet operator list.

The fleet operator list may be a list of all fleet operators known by the verification server or a subset of all fleet operators known by the verification server, such subset comprising fleet operators associated with the mobile device application.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

This system provides a way for individuals to download a mobile application to a mobile device from a common app store and access a desired data center using a secure and simple verification system. This may be a particularly useful application for employees who drive fleet vehicles and require access to their employer's database using mobile devices. Fleet employees may be spread out across a wide geographic area while the employer database may be in one central location. Verification is done through the software provider's verification server. There is the option that all data passed between the fleet employee's mobile device and his employer's data center be encrypted. After downloading the app, the fleet employee may choose his employer from a list of fleet operators, then may use a username and password or PIN provided by the employer for the verification. This is a one-time verification. Subsequent uses may not require any further submission of username and password or PIN.

Figure 1:
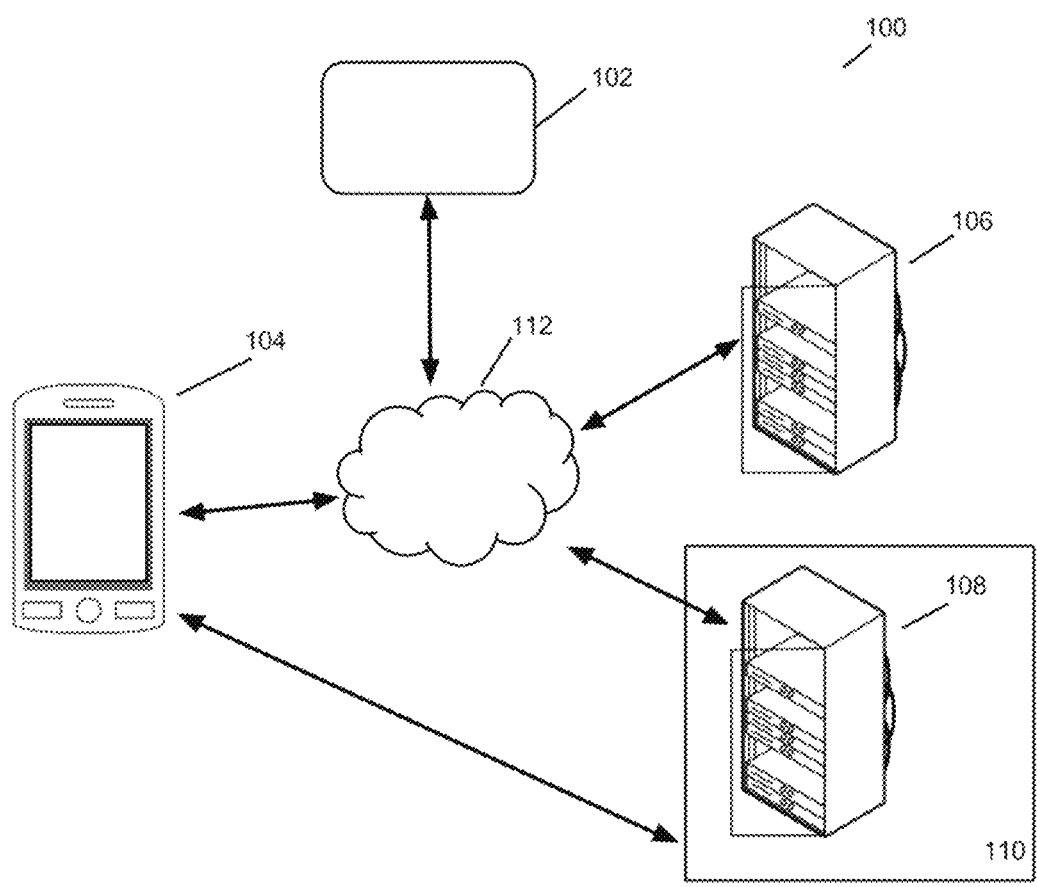
FIG. 1 is a diagram of a system for verifying a mobile application for use on a fleet operator data center, through a verification server according to a non-limiting embodiment of the present invention.

FIG. 1 is a diagram of a system 100 for verifying a fleet software mobile application comprising a mobile application store ("app store") 102, a user with a mobile computing device ("mobile user") 104, verification server 106, fleet operator server 108, fleet operator data center 110, and communication network 112.

To stay competitive, fleet operators must take advantage of existing software and technology such as smart phones and mobile apps to manage both their fleet employees and vehicles. Mobile applications on smart phones are an ideal solution because a fleet may be spread out across a wide geographic area but may require access to data and functionality from the "back office" (such as fleet tracking, management, scheduling, and the like) that may be accessed via a fleet software mobile application. For ease of use, these targeted fleet specific apps can be downloaded from common app stores. But in order to ensure only authorized personnel access the fleet information, some kind of verification system is needed.

App store 102 may be a commonly known app store such as Google Play or the App Store (iOS) that may allow the mobile user 104 to download one or more software applications to a mobile computing device.

Mobile user 104 may be any person who requires access to the fleet operator data center, for example an employee of a fleet operator, possibly driving a fleet vehicle, who may be using any mobile computing device, including tablets, smart phones, or laptops, that may allow the user to interface with the fleet operator data center through one or more mobile applications (such as to access functionality of the fleet operator data operator and/or fleet data such as vehicle identifiers, odometer values, vehicle locations and the like). The mobile application may use one or more URLs. One URL may be used for verification and redirecting to the fleet data center ("Verification URL"). The Verification URL may initially be preconfigured with the URL of the verification server. A second one or more URLs may be to one or more fleet operator's data center—where mobile user 104 will obtain the data they need ("Data Center URL" or "mobile device fleet operator URL"), which may be stored in the mobile device application storage once it is received via verification server 106. The user may require mobile access to any number of data records stored on the fleet operator's data center. For the purposes of this application, because the mobile application must be used by mobile user 104 using a mobile computing device, "mobile user 104" and "mobile application" may be used interchangeably for greater clarity throughout, as will be obvious to those skilled in the art.

The verification server 106 may comprise one or more hardware components including computers, data storage, processors and the like ("Computer Hardware") and one or more software components including applications and database components ("Computer Software"). It may be controlled by the software provider and may be located within the software provider's place of business. The verification server may be capable of network communication with the mobile user 104 and the fleet operator server 108 through the communication network 112. It may be capable of sending encrypted data between the fleet operator server 108 and the mobile user 104.

The fleet operator server 108 may comprise or include Computer Hardware and Computer Software. It may be controlled by the fleet operator and may be located within the fleet operator data center 110. The fleet operator server may be capable of communicating with the verification server 106 through the communication network 112. It may be capable of sending and receiving data used to verify the mobile user 104's credentials and may make a determination whether to grant access to the fleet operator data center based on the credential data.

The fleet operator data center 110 may be the central hub for a fleet operator's computer system. It may contain the software and data specific to an individual fleet operator on Computer Hardware and Computer Software, for example FleetFocus™ Fleet Management Software by Assetworks™. The fleet operator may use the data center to manage vehicles and employees and to keep track of a large quantity business-related data such as schedules, operating expenses, work orders, etc. Fleet software mobile application may communicate with the operator data center 110.

Communication network 112 may be substantially any public or private network, wired or wireless, and may be substantially comprised of one or more networks that may be able to facilitate communication between the various elements of system 100.

Figure 2A:
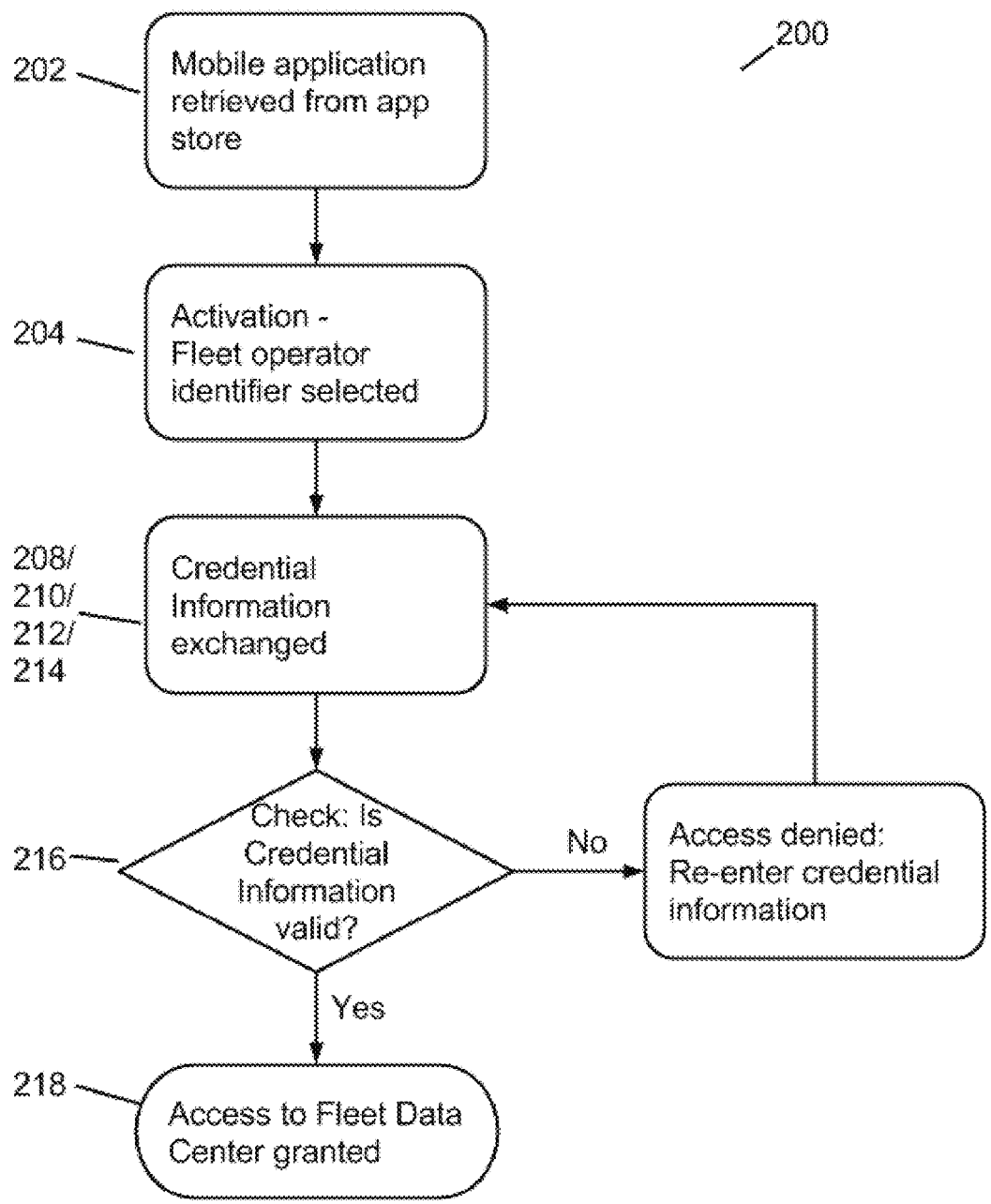
FIG. 2a is a flowchart showing the method for the mobile verification system according to a non-limiting embodiment of the present invention.
Figure 2B:
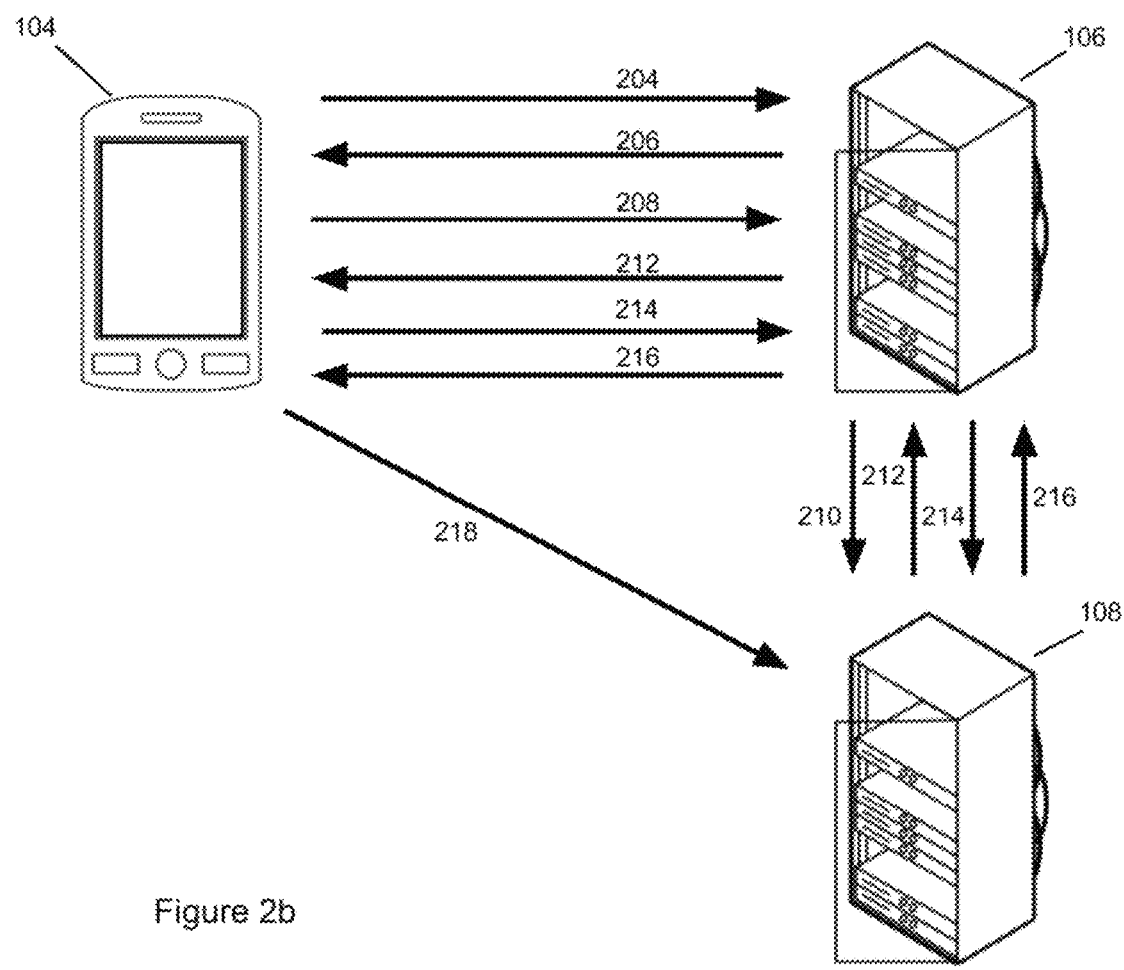
FIG. 2b is a diagram showing the direction of data transfer during the mobile verification process according to a non-limiting embodiment of the present invention.

FIGS. 2*a* and 2*b* illustrate a method 200 for verification of a mobile user for access to a fleet operator data center, using a third party software verification server. The mobile application is downloaded onto a mobile device from a common app store. The mobile user selects a unique fleet operator and a request is sent to the verification server. The verification server sends a request to the fleet operator and the fleet operator server responds with a credential format. The verification server passes the credential format to the mobile user. The user enters credentials, obtained in advance from the fleet operator, which pass through the verification server to the fleet operator server where they may be verified. If authenticated, the fleet operator server responds with a uniform resource locator for the fleet operator server with which the user will have gained access to the fleet operator data center.

At step 202, mobile user 104 retrieves a desired mobile application from the app store 102, appropriate to the fleet software of his employer the fleet operator. The app store may be a common app store such as Google Play® or Apple® App Store (iOS). The fleet operator employer may tell the mobile user employee which app to download, or the mobile application may contain the name of the fleet operator or some other identifier that may enable the mobile user to find the appropriate app. The mobile application may initially be unaware of the URL of the fleet operator data center 110. The Verification URL may be the URL of the verification server 106 and may be preconfigured with the mobile application. The verification server 106 may be aware of all fleet operator data centers 110 using a variety of mobile applications and may know each data center's URL (or may generate such information in response to a request for verification, for example). Alternatively, the mobile user 104 may enter the URL of the fleet's data center manually for example on a mobile application settings page.

At step 204, mobile user 104 may install and activate the mobile application. The mobile application may use the Verification URL (or "verification server URL") to communicate with verification server 106. In one embodiment of the invention, the mobile application may send to the verification server 106 a mobile application identifier and a request for a list of fleet operator identifiers. Sending the mobile application identifier and the request may be done automatically upon activation of the mobile application.

At step 206, the verification server 106 may generate and send a prompt to the mobile user 104 with a list of fleet operators that corresponds to the mobile software application identifier. The list ("Fleet Operator List") may be generated instantaneously when requested by the mobile user 104 and may change over time depending on the number of fleet operators using that particular mobile application. To generate the Fleet Operator List the verification server 106 may perform a search of fleet operator servers using the applicable mobile application. The Fleet Operator List may be modified by the verification server 106 before returning it to mobile user 104, creating a subset of the total fleet operators, that may be associated with the mobile device application, such as if a geographic location of mobile user 104 is sent with the request and indicates that one or more particular fleet operators do not apply, or some other form of filtering (that may include information stored in the application when it was downloaded from a particular app store or via a particular link). The prompt may ask the mobile user 104 to select a particular fleet operator for which the mobile user 104 would like to gain access to. The mobile user 104 may select the desired fleet operator from a number of fleet operator identifiers displayed in a list on the mobile computing device.

Steps 204 and 206 may be performed automatically by the mobile application and the verification server 106 so that they appear seamless to the mobile user 104, i.e.: mobile user 104 sees a list of potential fleet operators to choose from upon activation of the mobile application but is not otherwise aware of the communication between the mobile device and verification server 106.

In another embodiment of the invention, to address privacy concerns, one or all fleet operators appearing on the list may be configured in a way so that they remain anonymous, for example via a list of codes. In that case, mobile user 104 would have to know the desired code. The entire list may be encoded, or it may be limited to certain operators that wish to remain anonymous. The mobile user 104 may select the corresponding code of the desired fleet operator from a number of encoded fleet operator identifiers displayed in a list on the mobile computing device.

In another embodiment, the mobile user 104 may enter a code instead or some other identifier that identifies the fleet operator he needs to access to maintain privacy. Such a code would need to be provided to the user in advance and/or separately.

In another embodiment, the mobile user 104 may perform a search for a fleet operator by entering text into a field on the mobile device screen. The mobile application may auto-complete part of the entry or perform a search based on the text entered (and possibly the location of mobile user 104) and present the user 104 with one or more fleet operator data centers.

In another embodiment, the mobile user 104 may manually enter a URL of the fleet operator server 108 if it is known by the mobile user 104.

At step 208, the mobile user 104 may select a fleet operator identifier (a selected fleet operator) and a request may be sent to verification server 106 to obtain the required verification details. The mobile application may also send a public encryption key along with the request.

At step 210, using the selected fleet operator identifier, the verification server 106 may notify the specific fleet operator server 108 that a request has been made for access to the affiliated fleet operator data center 110. The verification server 106 may also send the public encryption key to the fleet operator server 108. The verification server 106 may then make a request to the fleet operator server 108 for unique authentication parameters in a specified, pre-determined form ("Credential Format"), such as a username and password or a PIN. The fleet operator may configure the form of the Credential Format, and the form may be different for different mobile applications. The fleet operator may have the ability to configure the Credential Format for each individual user 104, or a class of users.

At step 212, the fleet operator server 108 may encrypt the Credential Format using the public encryption key sent by the mobile application. The fleet operator server 108 may then send encrypted Credential Format along with a second public encryption key that may be used to encrypt the mobile user 104's inputs to the mobile application. Both sets of public encryption keys may ensure no data exchanged between the mobile user 104 and fleet operator server 108 may be visible to the verification server 106. The verification server 106 may then send the Credential Format to the mobile user 104 and request that the mobile user 104 enter the specific parameters that will be used for verification. If Credential Information is encrypted by fleet operator server 108 then verification server 106 need not know what such fleet operator requires for verification, which may make the system more secure.

At step 214, the Credential Format challenge may be decrypted on the mobile device (for example using private/public key encryption), and the mobile user 104 may enter alphanumeric inputs ("Credential Information") and press a submit button. The Credential Information entered by the mobile user 104 may be encrypted using the second public encryption key provided by the fleet operator server in step 212. The mobile application may then take the entered alphanumeric inputs and generate a cryptographic signature ("Signature") that may be a hash of: (i) date and time details, (ii) URL, (iii) session ID, (iv) all data in the http packet (such as the Credential Information). The hash may be the result of an HMAC (Hashed Message Authentication Code) function. The user inputs and Signature may be sent to the verification server 106.

The fleet operator may have given the mobile user 104 the Credential Information, such as a username and password or a PIN, in advance. Credential Information may be any pre-defined hard-coded parameters used to verify user 104 and/or dynamic parameters that may pre-exist for the fleet operator. Credential Information may be unique to each user 104 depending on the configurations chosen by the fleet operator. The fleet operator may also configure the Credential Information so that multiple mobile users 104 may be authenticated using the same Credential Information. Mobile user 104 may have a predetermined number of attempts to enter Credential Information before being locked out of the of the verification system. The mobile application may then encrypt the Credential Information using a public encryption key before it is sent to the verification server 106, so that the verification server 106 may not be able to decipher the data. The public encryption key may be provided by the fleet operator data server 108. The fleet operator server 108 (or optionally verification server 106) may verify the Signature by attempting to reproduce the signature that was sent by the mobile application. The reproduction may be done by attempting to cryptographically sign the data that came from mobile user 104 using the same Credential Information that was used in the initial challenge. The verification server 106 may send the encrypted Credential Information to the fleet operator server 108.

At step 216, the fleet operator server 108 may then decrypt the credential information using a private encryption key and authenticate the Credential Information provided by the mobile user 104. The fleet operator server 108 may be the only entity with the private key that can decrypt the Credential Information. If authenticated, the fleet operator server 108 may send the appropriate fleet operator data center URL in an encrypted form to the mobile user 104 through the verification server 106. Once decrypted by the mobile application, the fleet operator data center URL may allow the mobile user 104 to communicate with the fleet operator data center 110. The fleet operator data center URL (Data Center URL) may replace the verification server URL (Verification URL), so that each time the mobile application is activated from that point on, the mobile application communicates directly with the fleet operator data center 110 using the Verification URL.

If the Credential Information is invalid, the fleet operator server 108 may not supply the necessary fleet operator data center URL, and the mobile user 104 may be informed that the Credential Information is invalid via a message sent by the fleet operator data server 108, for example a text message reading "Access Denied: Invalid Credentials. Two login attempts remaining".

At step 218, if the mobile application receives the fleet operator data center URL, the mobile application may automatically redirect to the fleet operator data center 110 using the Verification URL, where the Verification URL now points to the fleet operator data center URL (so that, potentially, verification server 106 does not even know the ending URL where the data is housed). The mobile application may automatically log into the fleet operator systems with the same credential information used during the verification process. The fleet operator data center URL may be securely cached for subsequent uses, i.e. the mobile user 104 may not need to go through the above verification process involving inputting Credential Information unless the mobile device was reset back to factory default settings and the mobile application was reinstalled. The mobile user 104 may now use the mobile application with access to the fleet operator data.

At any time the fleet operator may invalidate any Credential Information or set of Credential Information, either for an individual mobile user 104 or a class or users, which may then block the mobile user's 104 access to the fleet operator data center 110 despite any cached fleet operator data center URL.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A system for securely providing a mobile device application on a mobile device access to a fleet operator datacenter for the mobile device application to obtain fleet data therefrom for use by a mobile device user, the system comprising:

a verification server, comprising a non-transitory computer readable data storage and a processor, and a verification server uniform resource locator (URL) to facilitate communication therewith, the processor configured to:

provide a fleet operator list, of fleet operators having fleet operator datacenters, one of which is a selected fleet operator the mobile device user would like to gain access to, to a mobile device application on a mobile device in response to a request from the mobile device application for the fleet operator list, wherein the fleet operator list is a subset of all fleet operators known by the verification server, such subset comprising fleet operators using the mobile device application, such subset further based on a geographic location of the mobile device user;
  obtain the selected fleet operator from a plurality of fleet operators, from a mobile device user selection on the mobile device;
  receive a credential information request from the fleet operator server of the selected fleet operator;
  send the credential information request to the mobile device;
  communicate the credential information received from the mobile device to the fleet operator server to authenticate the mobile device user; and
  when the mobile device user is authenticated, transmit a fleet operator URL of the fleet operator server of the selected fleet operator to the mobile device application to be a mobile device fleet operator URL to which the mobile device application communicates to receive fleet data;
  wherein the request was provided by the mobile device to the verification server URL configured in the mobile device application before the mobile device application was downloaded from an app store and installed on the mobile device.

2. The system of claim 1 wherein the credential information request comprises a set of credential information that the selected fleet operator has configured to be required for authenticating a mobile device user.

3. The system of claim 2 wherein the verification server is further configured to receive a first public encryption key from the mobile device and the communicated credential information request is encrypted by the fleet operator server using the first public encryption key before it is received from the fleet operator server.

4. The system of claim 3 wherein the credential information request further comprises a second public encryption key and the communicated credential information is encrypted by the mobile device using the second public encryption key before it is received from the mobile device.

5. The system of claim 4 wherein the communicated credential information received from the mobile device to the fleet operator server is embedded within a signature, and the signature comprises a hash value of the credential information, date and time information and session information.

6. A system for securely providing a mobile device application on a mobile device access to a fleet operator datacenter for the mobile device application to obtain fleet data therefrom for use by a mobile device user, the system comprising:
  a wireless device having computer-executable instructions, on a non-transitory computer readable data storage and executable by a processor, implementing software for:
    getting a fleet operator list, of fleet operators having fleet operator datacenters, one of which is a selected fleet operator the mobile device user would like to gain access to, from a verification server, wherein the fleet operator list is a subset of all fleet operators known by the verification server, such subset comprising fleet operators using the mobile device application, such subset further based on a geographic location of the mobile device user;
    selecting the fleet operator from a plurality of fleet operators on the fleet operator list and communicating the selected fleet operator to the verification server via a verification server uniform resource locator;
    receiving, from the verification server, a credential information request obtained by the verification server from a fleet operator server of the selected fleet operator;
    enabling inputting and sending of credential information, from a mobile device user, responsive to the credential information request, to a verification server via a verification server uniform resource locator (URL) to send to the fleet operator server of the selected fleet operator to authenticate the mobile device user; and
    when the mobile device user is authenticated, obtaining, from the fleet operator server via the verification server, a uniform resource locator of the fleet operator server of the selected fleet operator to be a mobile device fleet operator URL to which the mobile device application communicates to receive fleet data,
    wherein the mobile device further comprises the verification server URL, to facilitate communication with the verification server, configured in the mobile device application before the mobile device application was downloaded from an app store and installed on the mobile device.

7. The system of claim 6 wherein the credential information request comprises a set of credential information that the selected fleet operator has configured to be required for authenticating a mobile device user.

8. The system of claim 7 wherein the credential information request further comprises a public encryption key and the communicated credential information is encrypted by the mobile device using the public encryption key before it is sent by the mobile device.

9. The system of claim 8 wherein the credential information sent by the mobile device is embedded within a signature, and the signature comprises a hash value of the credential information, date and time information and session information.

10. The system of claim 7 wherein the credential information request is encrypted and can only be decrypted by the mobile device application.

11. The system of claim 1 wherein one or all fleet operators appearing on the fleet operator list are configured in a way so that they remain anonymous.

12. The system of claim 6 wherein one or all fleet operators appearing on the fleet operator list are configured in a way so that they remain anonymous.

* * * * *